United States Patent
Shore

(10) Patent No.: US 11,439,117 B2
(45) Date of Patent: Sep. 13, 2022

(54) MILKING CLUSTER SUPPORT ARM WITH AUTOMATIC HOSE SUPPORT DROP

(71) Applicant: GEA Farm Technologies, Inc., Naperville, IL (US)

(72) Inventor: Jonathan V. Shore, Galesville, WI (US)

(73) Assignee: GEA FARM TECHNOLOGIES, INC., Romeoville, IL (US)

( * ) Notice: Subject to any disclaimer, the term of this patent is extended or adjusted under 35 U.S.C. 154(b) by 161 days.

(21) Appl. No.: 16/183,295

(22) Filed: Nov. 7, 2018

(65) Prior Publication Data

US 2020/0137976 A1    May 7, 2020

(51) Int. Cl.
*A01J 7/00* (2006.01)
*F16L 3/14* (2006.01)

(52) U.S. Cl.
CPC .. *A01J 7/00* (2013.01); *F16L 3/14* (2013.01)

(58) Field of Classification Search
CPC ...... A01J 7/00; A01J 5/00; A01J 5/017; A01J 5/0175; B65D 63/10; B65D 63/1018; B65D 63/1027; F16L 3/14
USPC ........ 119/14.1, 14.45, 14.08, 14.13
See application file for complete search history.

(56) References Cited

U.S. PATENT DOCUMENTS

| | | | |
|---|---|---|---|
| 2,136,228 A | | 11/1938 | Babson et al. |
| 2,440,012 A | * | 4/1948 | Haver ............... G09F 3/0352 24/30.5 R |
| 2,477,366 A | * | 7/1949 | Easton ............... A01J 5/04 248/575 |
| 3,251,570 A | * | 5/1966 | Frost ............... A01J 5/017 248/279.1 |
| 3,593,687 A | * | 7/1971 | Clegg ............... A01J 5/017 119/14.1 |
| 3,938,470 A | * | 2/1976 | Pace ............... A01J 5/017 119/14.1 |
| 3,962,575 A | | 6/1976 | Vandenberg et al. |
| 4,228,763 A | * | 10/1980 | Heidecker ............ A01J 5/017 119/14.08 |
| 4,228,764 A | * | 10/1980 | Plett ............... A01J 5/017 119/14.08 |
| 4,333,421 A | * | 6/1982 | Schluckbier ......... A01J 5/017 119/14.08 |
| 4,491,085 A | | 1/1985 | Rubino |

(Continued)

FOREIGN PATENT DOCUMENTS

CN    201467788 U    5/2010
CN    102715093 A    10/2012
(Continued)

OTHER PUBLICATIONS

International Search Report and Written Opinion for International Application No. PCT/US2019/053723 dated Jan. 15, 2020, 15 pages.

(Continued)

*Primary Examiner* — Peter M Poon
*Assistant Examiner* — Danielle A Clerkley
(74) *Attorney, Agent, or Firm* — Patent Portfolio Builders PLLC

(57) ABSTRACT

A milker unit detacher with an adjustable and releasable hose support and a support arm that pivots about a tilted axis to bias the support arm toward a milking position to maintain engagement with the adjustable hose support member.

9 Claims, 14 Drawing Sheets

(56) References Cited

U.S. PATENT DOCUMENTS

| | | | | |
|---|---|---|---|---|
| 5,093,964 | A | * 3/1992 | Rowland | B65H 75/366 |
| | | | | 24/16 PB |
| 5,950,561 | A | * 9/1999 | Redmond | A01J 5/017 |
| | | | | 119/14.23 |
| 5,960,737 | A | 10/1999 | Larson et al. | |
| 6,289,845 | B1 | * 9/2001 | Andersson | A01J 5/017 |
| | | | | 119/14.1 |
| 6,814,027 | B2 | 11/2004 | Hein et al. | |
| 6,990,923 | B2 | 1/2006 | Hein et al. | |
| 7,891,316 | B1 | * 2/2011 | Maljaars | A01J 7/00 |
| | | | | 119/14.1 |
| 8,677,936 | B2 | 3/2014 | Larson et al. | |
| 8,800,486 | B2 | * 8/2014 | Daniel | A01J 7/025 |
| | | | | 119/14.02 |
| 8,925,484 | B2 | * 1/2015 | Maier, Jr. | A01J 7/00 |
| | | | | 119/14.18 |
| 9,499,317 | B2 | 11/2016 | Comaniuk et al. | |
| 2007/0277737 | A1 | 12/2007 | Maier et al. | |
| 2010/0024734 | A1 | 2/2010 | Gingrich et al. | |
| 2014/0332639 | A1 | 11/2014 | Ahlem et al. | |

FOREIGN PATENT DOCUMENTS

| | | | | |
|---|---|---|---|---|
| DE | 8707855 | U1 | 10/1987 | |
| DE | 4219290 | A1 | 12/1993 | |
| DE | 4324915 | B4 | 12/2005 | |
| JP | 09177158 | A | 7/1997 | |
| JP | 11006545 | A | 1/1999 | |
| JP | 11285325 | A | 10/1999 | |
| JP | 2002-005151 | A | 1/2002 | |
| KR | 101540995 | B1 * | 8/2015 | H02G 3/30 |
| NL | 8701904 | A | 3/1989 | |
| WO | 99/52346 | | 10/1999 | |
| WO | 2001/67848 | A1 | 9/2001 | |
| WO | 2004/023866 | A2 | 3/2004 | |
| WO | 2009/151631 | A3 | 12/2009 | |
| WO | 2011/084897 | A1 | 7/2011 | |

OTHER PUBLICATIONS

PCT Collaborative Search and Examination Pilot Peer Contribution Report from the United States Patent and Trademark Office, dated Dec. 3, 2019, 10 pages.
PCT Collaborative Search and Examination Pilot Peer Contribution Report from the Japan Patent Office, dated Dec. 10, 2019, 8 pages.
PCT Collaborative Search and Examination Pilot Peer Contribution Report from the China National Intellectual Property Administration, dated Dec. 17, 2019, 10 pages.
PCT Collaborative Search and Examination Pilot Peer Contribution Report from the Korean Intellectual Property Office dated Dec. 24, 2019, 11 pages.
GEA Farm Technologies AutoRotor PerFormer video, https://www.youtube.com/watch?v=G_KTOLkQ_ko&t=3s, Mar. 21, 2012 (See minutes 3 to 5).
DeLaval Rotary Systems: Performance Builty Your Way Brochure, 16 pages, 2017.
Photos of DeLaval Support Arm, taken Feb. 13, 2020, 5 pages.
Screenshots from video of DeLaval Support Arm, available at least by May 2018, 3 pages.
International Preliminary Report on Patentability for International Application No. PCT/US2019/053723, dated May 20, 2021, 9 pages.
Office Action dated May 27, 2022 in related/corresponding CN Application No. 201980073098.4.

* cited by examiner

MILKING CLUSTER SUPPORT ARM WITH AUTOMATIC HOSE SUPPORT DROP

FIELD AND BACKGROUND OF THE INVENTION

This invention relates generally to milking parlors and more particularly to milker unit detachers having an adjustable hose support mechanism for supporting milker unit hoses during a milking operation.

In dairy harvesting facilities, dairy animals are milked while standing in stalls. Attached to the dairy animals is a milker unit, which typically includes a teat cup assembly, with each teat cup assembly having a short milk tube joined to a milk collecting bowl. Milk collected by the milker unit is delivered to central dairy milk collection lines by a hose. The milker units are operated using pulsator and vacuum hoses, and teat dip and backflushing tubes and hoses can also be included.

When not milking, the milker unit is generally stored to the side of the stall in a parked position to enable the dairy animal to enter and leave the stall without interference from the milker unit and its various supports and hoses. Once the animal is in the stall, an operator moves the milker unit from the parked position to a milking position under the animal, and attaches it for milking. After milking, the milker unit, tubes, and hoses are withdrawn from the milking position toward the parked position using a detacher mechanism while they are supported by a retractable support arm that is mounted in a cabinet or other structure adjacent to the stall. Support arms typically pivot out of the way to the parked position while animals are entering and leaving the milking stalls to avoid interfering or being damaged by the animals.

When the milker unit is attached to an animal being milked, the supporting end of the support arm is spaced apart from the animal, so the milker unit is supported to the animal solely by the vacuum being applied inside each of the teat cups. The force applied by the vacuum is sufficient to support the milker unit, and even the hoses, to some extent. Nonetheless, a hose support can be used to provide further support for the various milker unit hoses during milking and the retraction process. Without a hose support, the hoses may hang down and drag on the stall floor where they can be stepped on by an animal and stop the flow of milk. The hoses should also provide a generally downward flow path without any sections where milk can collect, so that milk can flow freely to the central dairy line. Unsupported hoses can add unnecessary additional weight to the milker unit that must be carried by the vacuum acting on the animal's teats. Finally, allowing hoses to drag on the floor exposes them to damage, dirt, manure, and sanitizers used to clean dairy floors.

Various types of hose supports have been developed to maintain the hoses in a position safe from being stepped on by animals. Typically, the hose supports are ropes, cords, or other flexible members that are joined at one end to the stall structure or detacher cabinet, and the other end to a convenient hose location to support the hoses above the floor. A single or fixed cord length can support the hoses above the floor in most cases, but due to different animal udder and teat heights, a single length for a hose support may work for udders of an average height, but will result in the hoses dragging on the floor when the udders hang lower, or provide insufficient hose support when the udders are higher.

Further, hose supports are themselves capable of entangling an animal entering or leaving a stall. Operators must also work around all hoses and hose supports as they are attaching milker units to animals. Adding a cord as a hose support can simply add to the difficulty of the operator working in tight spaces, as well as avoiding interference with the support arm and milker unit hoses during retraction.

Thus, there is a need for a milker unit hose support mechanism and support arm that are convenient to use, adjustable to accommodate different animal anatomies, and does not interfere with the support arm during movement between the parked position and the milking position.

SUMMARY OF THE INVENTION

A hose support for hoses joined to a milker unit in accordance with the present invention can include: a frame; a support arm pivotably joined to the frame for movement between a milking position and a parked position; a stationary jaw fixed to the frame and defining a hose support; an adjustable hose support member having a plurality of positions releasably engageable with the hose support when the support arm is in the milking position and disengaged from the hose support when the support arm is in the parked position.

The support arm can be moved from the parked position to the milking position by force of gravity. The milker unit detacher can also include a pivot, and can also be joined to the frame and the support arm, and define an axis of rotation that is offset from vertical. The axis angle can be between about 15° and about 35°, and more particularly, between about 20° and about 30°.

The milker unit hose support can further include a moving jaw fixed to the support arm for movement therewith, and disposed to at least partially entrap the adjustable hose support at a first position when the support arm is in the milking position, and to be substantially spaced apart from the stationary jaw when the support arm is in the parked position. The moving jaw can be fixed to the support arm for movement therewith, and be disposed to at least partially close the hose support and entrap the adjustable hose support member at a second position when the support arm is in the milking position, and to move the moving jaw away from the stationary jaw when the support arm is in the parked position to allow the hose support member to disengage from the hose support. The moving jaw can disengage the flexible hose support member from the hose support as the support arm moves toward the parked position and the support arm can cause the flexible hose support member to drop from the hose support.

DETAILED DESCRIPTION OF THE INVENTION

Figure 1:
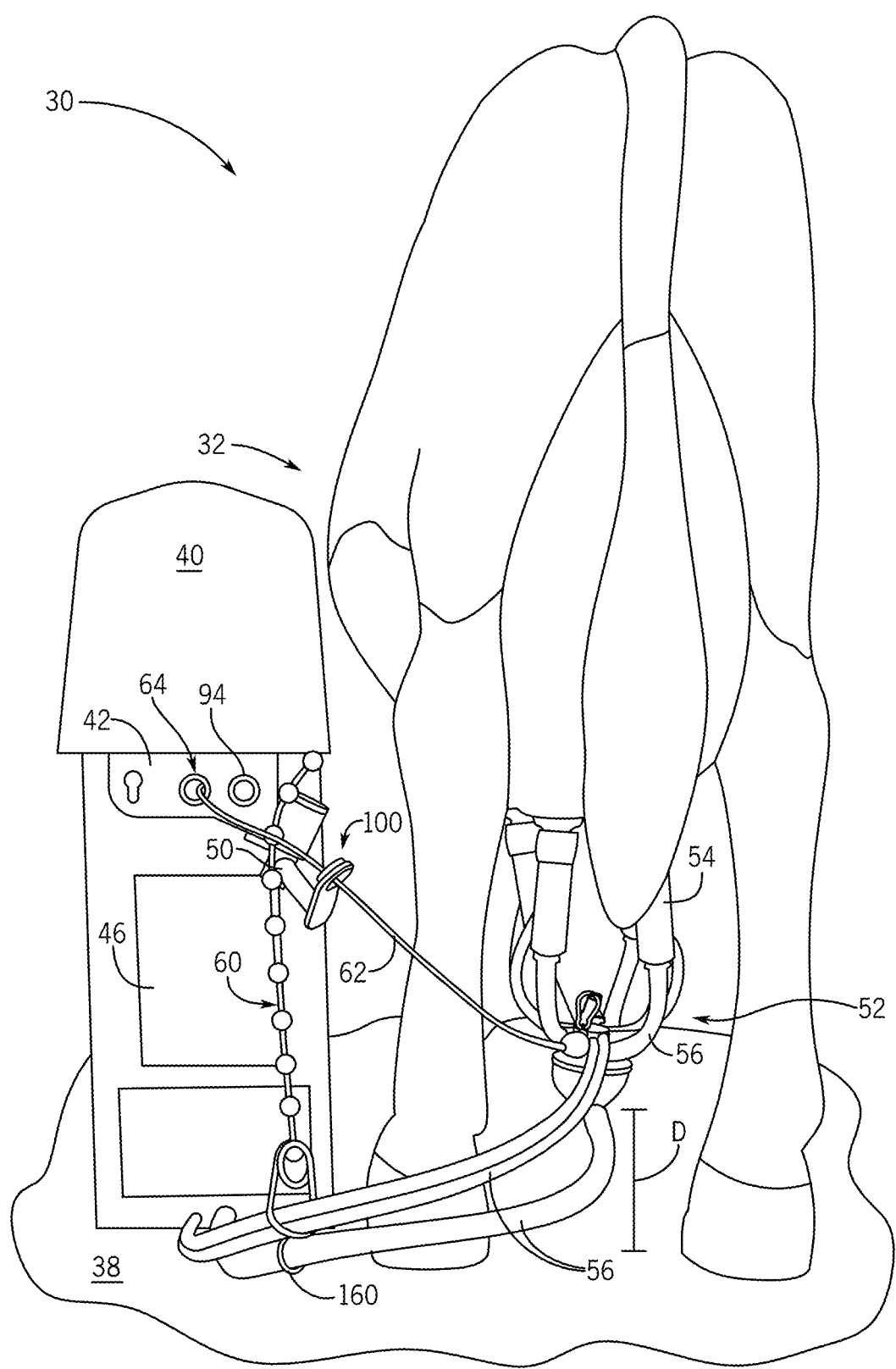
FIG. 1 is a front view of a milker unit detacher cabinet having a support arm and adjustable hose support in accordance with the present invention in a milking position and supporting a milker unit and hoses.

In the following detailed description of the drawings, the same reference numeral will be used to identify the same element in each of the figures.

Illustrated generally in FIGS. 1 through 8 is a dairy milking parlor 30, which in this example is a rotary milking parlor divided into a number of milking stalls 32, each having a floor 38 and side walls (not illustrated). At the exterior end the milking stall 32 is a cabinet 40 for housing a milker unit detacher mechanism within the cabinet and accessible by cabinet door 46.

Figure 5:
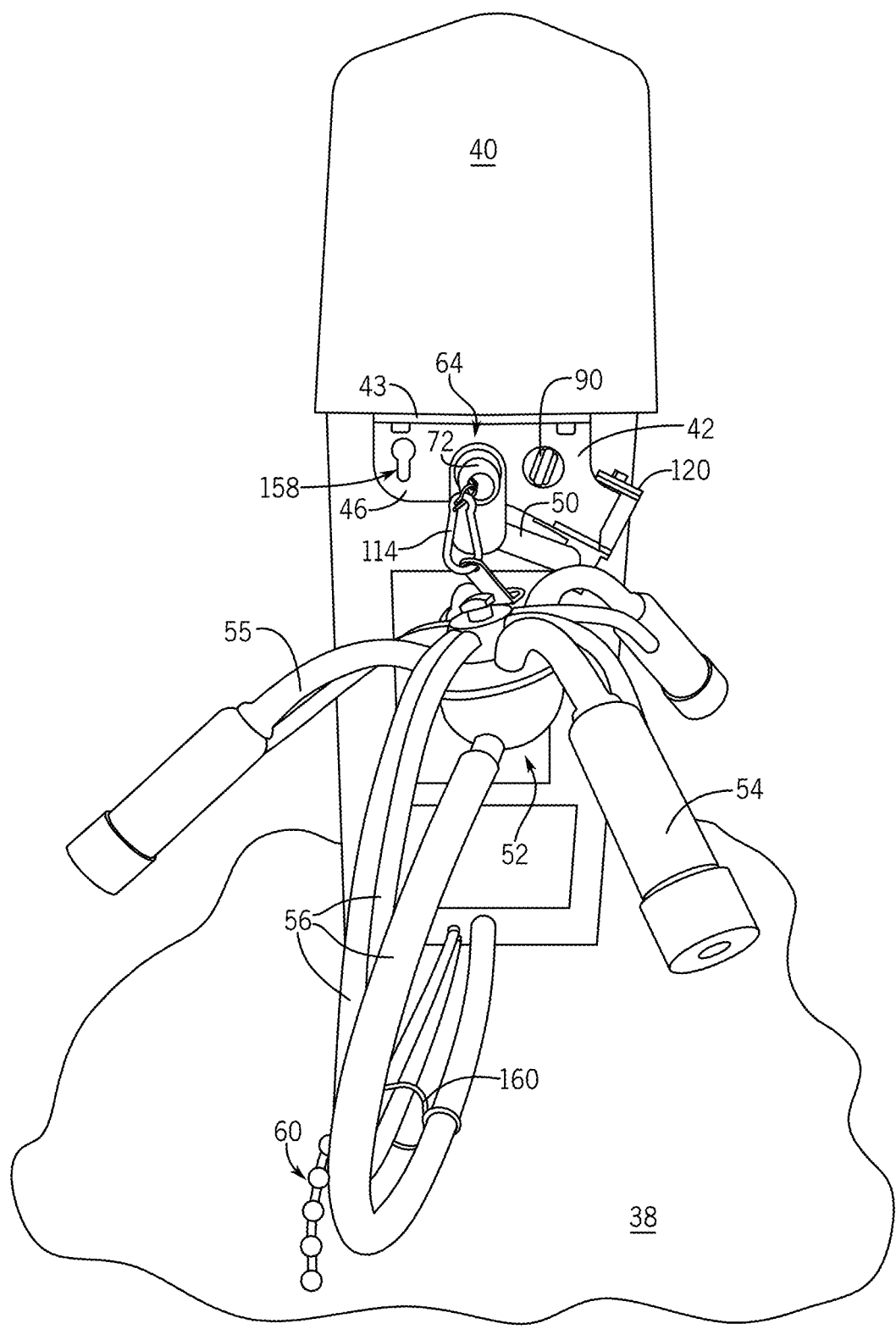
FIG. 5 is a partial front view of the support arm and adjustable hose support of FIG. 1 in the parked position.
Figure 6:
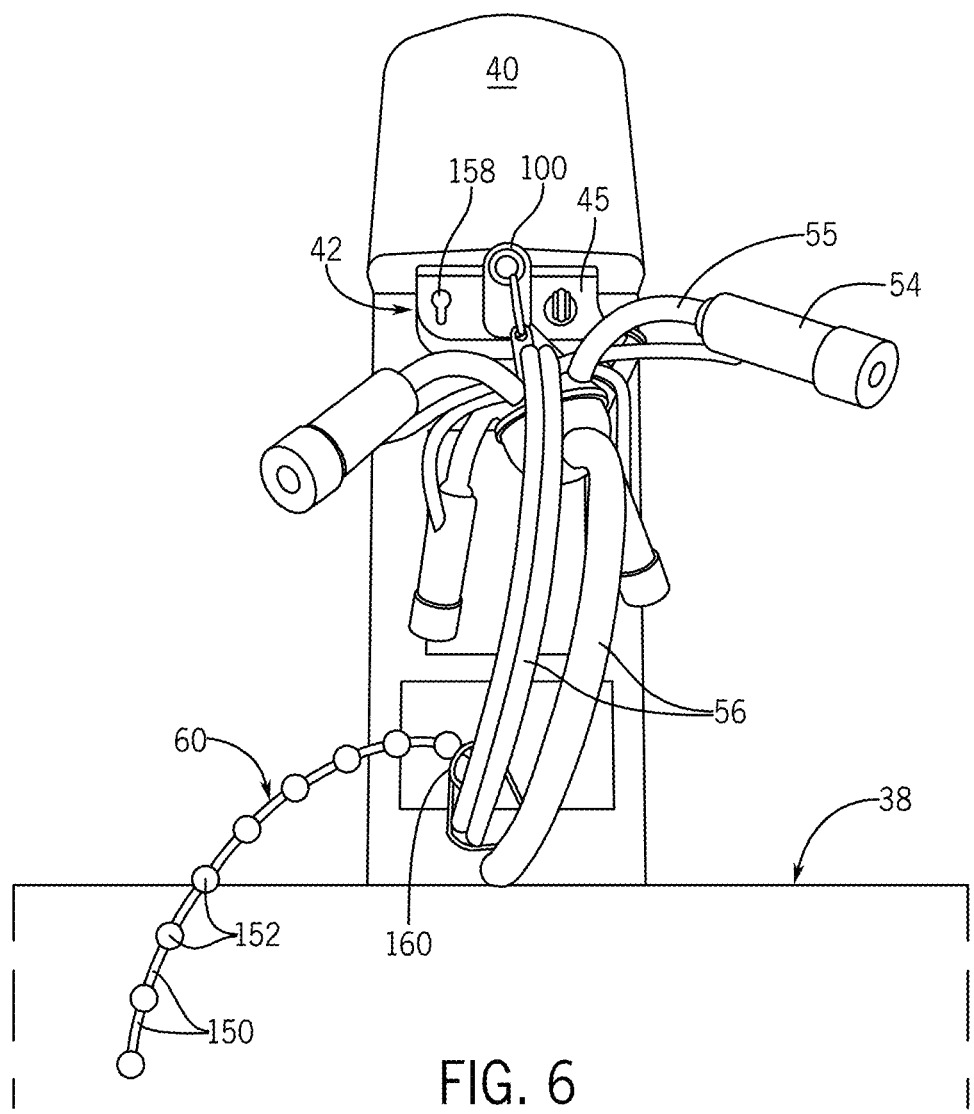
FIG. 6 is a front view of the cabinet, support arm, and adjustable hose support of FIG. 1 in the parked position.
Figure 7:
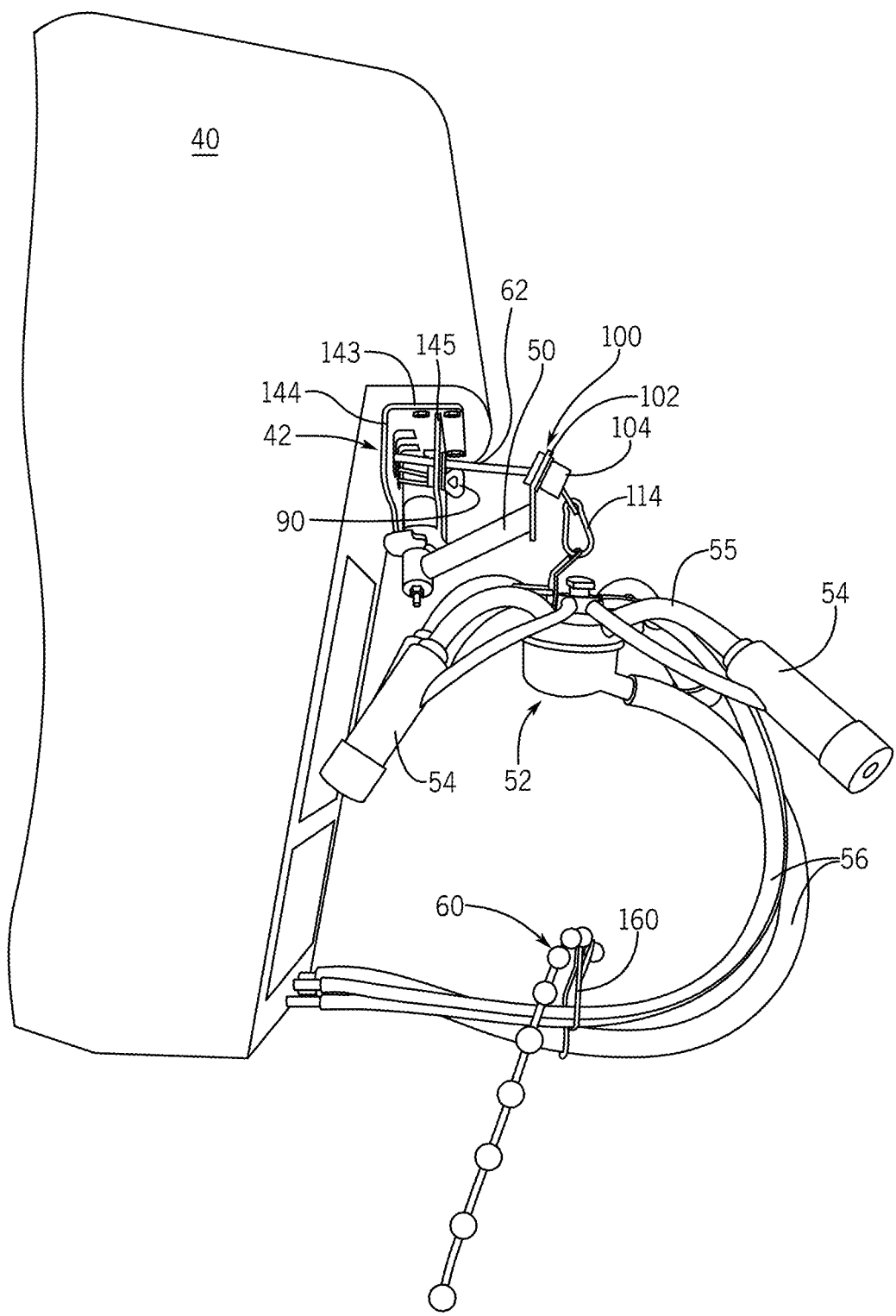
FIG. 7 is a side view of the cabinet, support arm, and adjustable hose support of FIG. 1 in the parked position.
Figure 8:
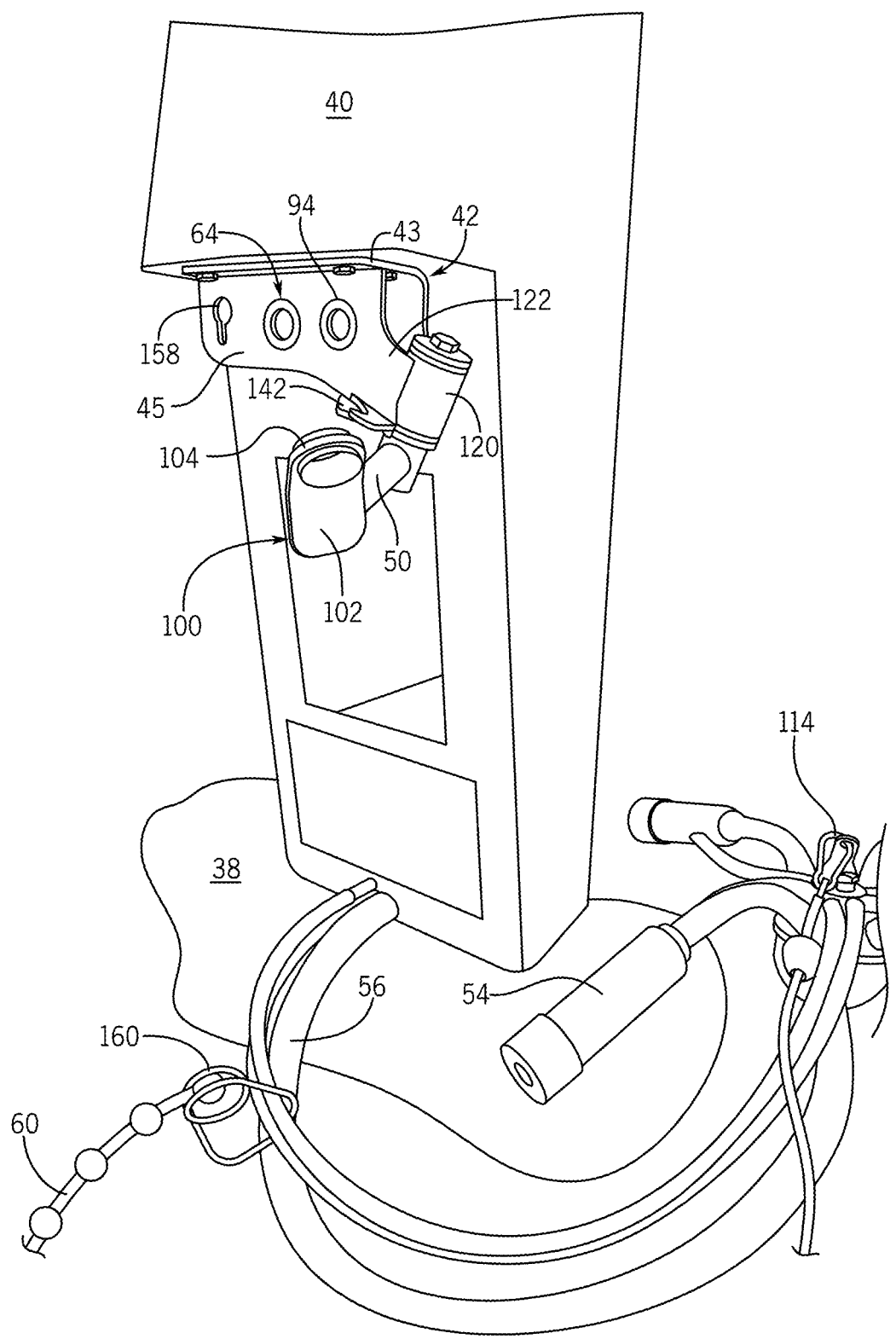
FIG. 8 is a perspective view of the cabinet, the support arm, and adjustable hose support of FIG. 1 in a milking position, but with the detacher cord and adjustable hose support disconnected.

Mounted on the cabinet 40, is a support arm 50 that supports a milker unit 52 when in a parked position, which is illustrated in FIGS. 5 through 7, for example, as being adjacent to a front side of the cabinet 40. Also illustrated are a number of hoses 56 that can include milk hoses, vacuum hoses, teat dip tubes, and backflushing hoses.

FIGS. 1 through 4 illustrate a cow standing in a milking stall 32 with the support arm 50, the milker unit 52 with teat cups 54 and short milk tubes 55, and the hoses 56 in the milking position. Between the milker unit 52 and the stall floor 38 there is a distance "D" between the hoses 56 that are sagging down from the milker unit 52 at least a portion of the distance D and the floor 38. The hoses 56 should not hang low enough for an animal to step on or create a segment where milk collects. Further, the hoses 56 should not contact the stall floor 38 or dragged on the stall floor 38 through any animal waste or dirt that may be there.

To suspend the hoses 52 above the stall floor 38, a hose support member 60 is provided. One end of the hose support member 60 is attached to the cabinet 40 and the other end to the hoses 56 at a suitable central location for suspending the hoses 56.

If all the dairy animals were the same height and had udders of the same dimension, the hose support member 60 could be a fixed length and never require adjustment. Of course, dairy animals vary in size and udder height, so the distance between the udders and the stall floor 38 may be more or less than dimension D in FIGS. 1 and 2. If the hose-to-floor dimension is less than D (the udder is closer to the stall floor 38), then the hoses 56 could drag on the stall floor 38, especially as they move between the parked position and the milking position. The present invention provides an adjustable hose support member 60 to accommodate such varying conditions.

Other cabinet 40 and milker unit 52 arrangements are possible for the parked position, including having the support arm 50 and the milker unit 52 disposed on the side of a cabinet 40, adjacent to or under a portion of the side wall 34, or partially or wholly inside the cabinet 40, as examples, and still be within the scope of the present invention. Indeed, a cabinet 40 is not entirely necessary because the detacher mechanism 46, support arm 50, and milker unit 52 can all be left exposed while being supported by another part of the dairy structure, including one of the dairy milking stall 32 side walls 34, for example. Nonetheless, the cabinet 40 provides structural support and protection for the mechanical elements described herein, and is a preferred support structure.

Mounted on the cabinet in any suitable manner (including bolting and welding) is a support arm frame 42 (isolated in FIGS. 9 through 14), and in the illustrated embodiment, the support arm frame includes a base plate 43, an inner support plate 44, and an outer support plate 45 spaced apart from the inner support plate 44. The inner support plate 44 and the outer support plate 45 both extend downwardly from the base plate 43, and are joined to the base plate 43 in any suitable manner. In the illustrated embodiment, the inner support plate 44 is simply a portion of the base plate 43 bent downwardly and the other base plate 45 is welded to the base plate 43. Any other form of connection can be used, so long as it can endure the harsh dairy environment and withstand the cyclical loads applied by the mechanism described below. Other support arm frame 42 structures can be used as well. Further, the inner support plate 44 and the outer base plate 45 include holes, grooves, or other openings to accommodate and support the features described below.

At the end of milking, the milker unit detacher 46 is activated to withdraw the milker unit 52 and support arm 50 from a milking position to the parked position of FIGS. 5 through 7. Preferably, the milker unit detacher 46 is activated automatically in response to any desired end-of-milking parameter including time, milk quantity, milk quality, or any other suitable parameter.

In one embodiment, the milker unit detacher mechanism 46 includes a pneumatic piston 58 that retracts a flexible retraction member 62, such as a cord having one end joined to the cylinder 58 and the other end joined to the milker unit 52. The flexible retraction member 62 is referred to below as a "cord," which can include any flexible member that can apply tension to the milker unit 52 for movement toward the parked position. Preferably the flexible retraction cord 62 extends through or around an extension point 64 joined to, machined in, or otherwise a part of, the support arm frame 42 to gain a mechanical advantage because the flexible retraction cord 62 extends straight from the piston 58 and then laterally along the support arm 50 to the milker unit 52 when in the milking position. The extension point 64 provides a turning point for the flexible retraction cord 62 to turn laterally, and is preferably positioned to draw the flexible retraction cord 62 and the milker unit 52 toward the parked position with a reduced chance of binding, tangling, and wear.

The extension point 64 is illustrated as a hole in the support arm frame 42 (particularly in the outer support plate 45), but it could be a hook, an end of a plate, a notch, a tube, or any other feature that serves the purposes described above. In the embodiment depicted herein, the extension point 64 hole is preferably lined with a friction reducing member 72 of machined stained stainless steel tube having a tapered exterior portion and a retaining portion inside the outer support plate 45 to receive any suitable fastener, such as the C-shaped spring retainer. The tapered exterior portion is machined relatively smoothly to minimize friction and wear on the flexible retraction cord 62.

The extension point 64 is aligned with a mating hole 82 (FIGS. 3 and 19) in the inner support plate 44. Preferably, the flexible retraction cord 62 does not contact the edges of the mating hole 82 (FIGS. 3 and 19) to reduce friction and wear, but there could be contact, if it were desired to guide the flexible retraction cord 62 in a different direction by offsetting the extension point 64 and the mating hole 82, for example.

Figure 3:
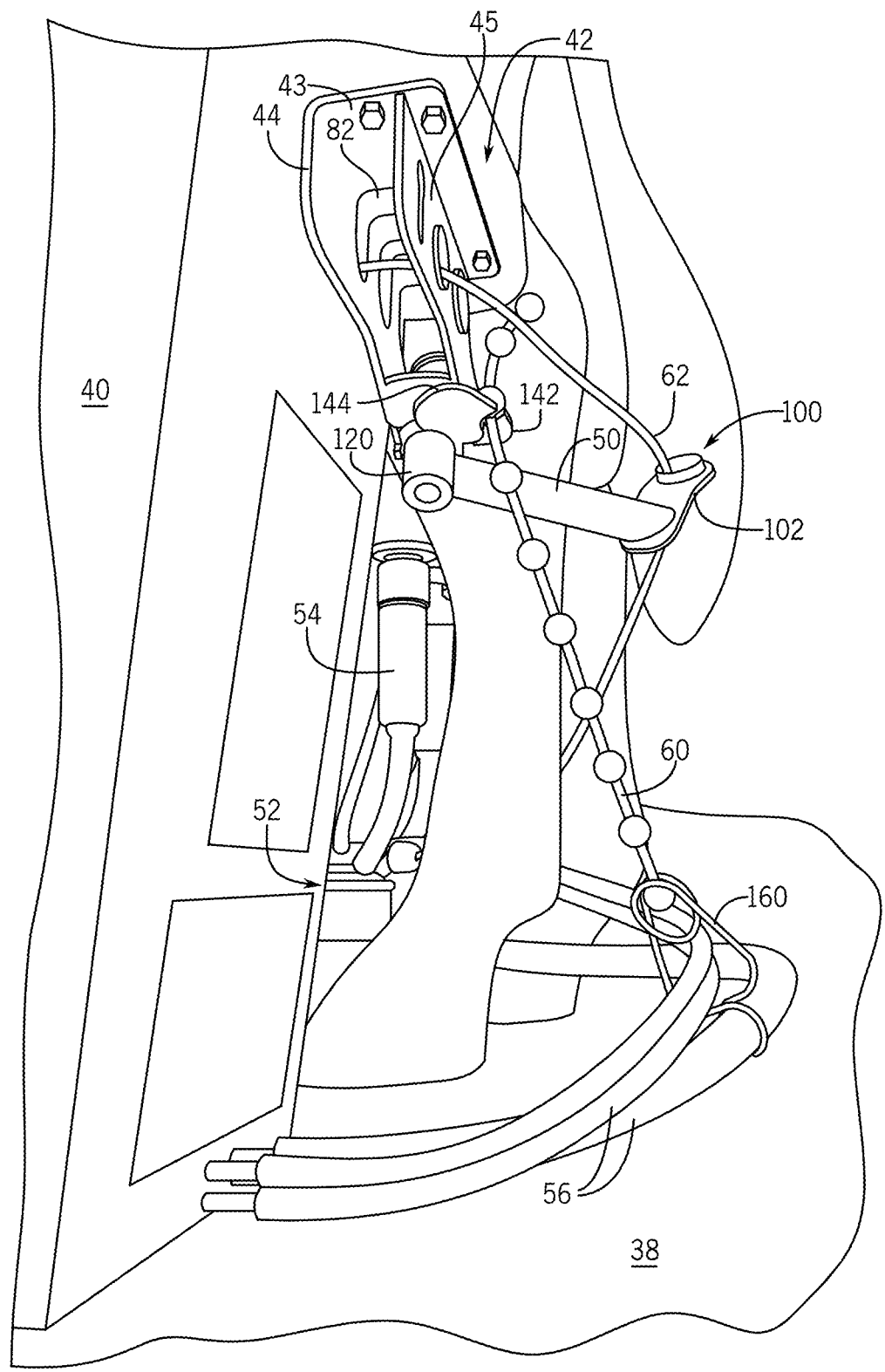
FIG. 3 is a side view of the support cabinet, arm, and adjustable hose support of FIG. 1.
Figure 4:
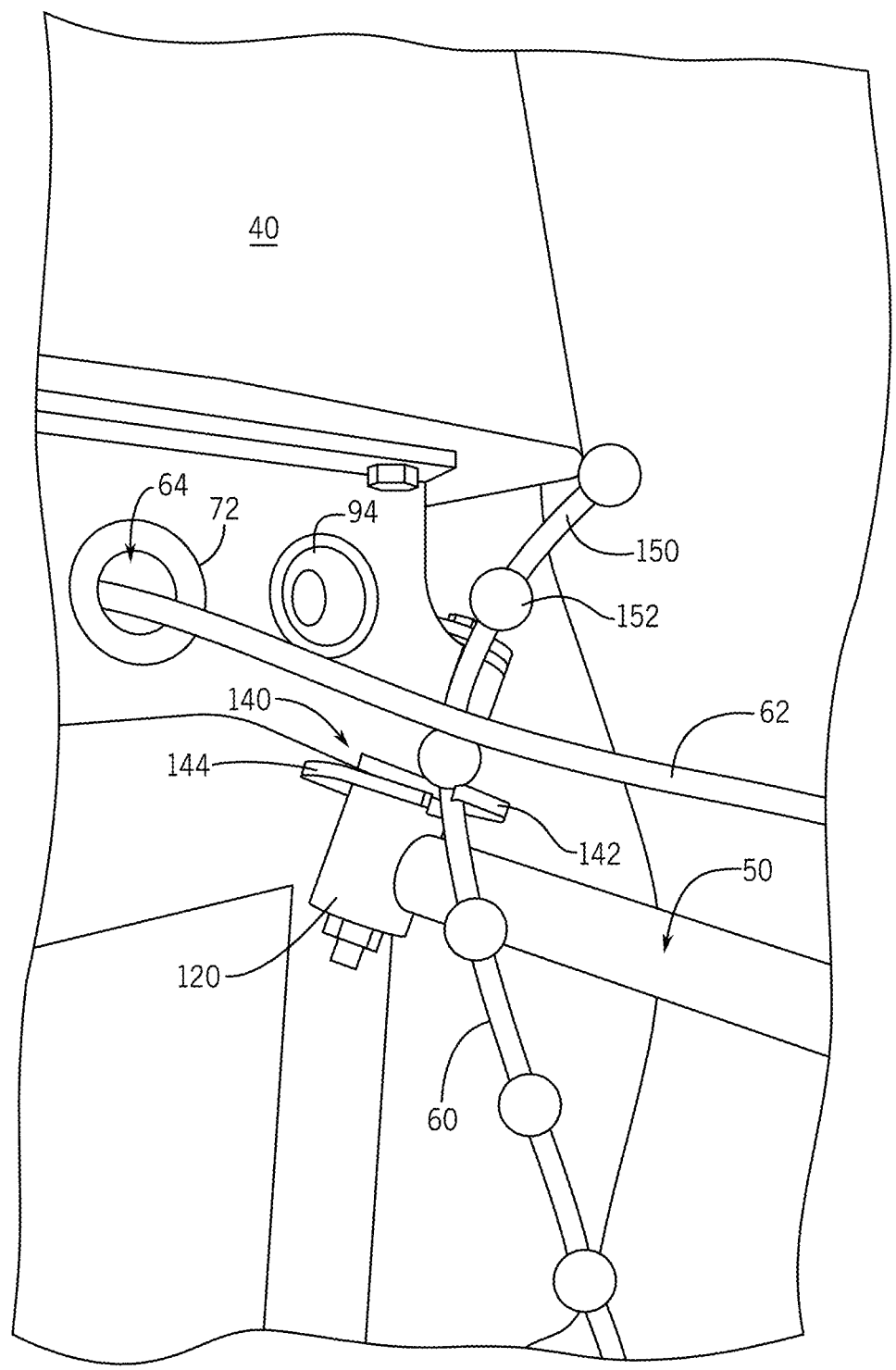
FIG. 4 is a partial perspective view of the support cabinet, arm, and adjustable hose support of FIG. 1.
Figure 19:
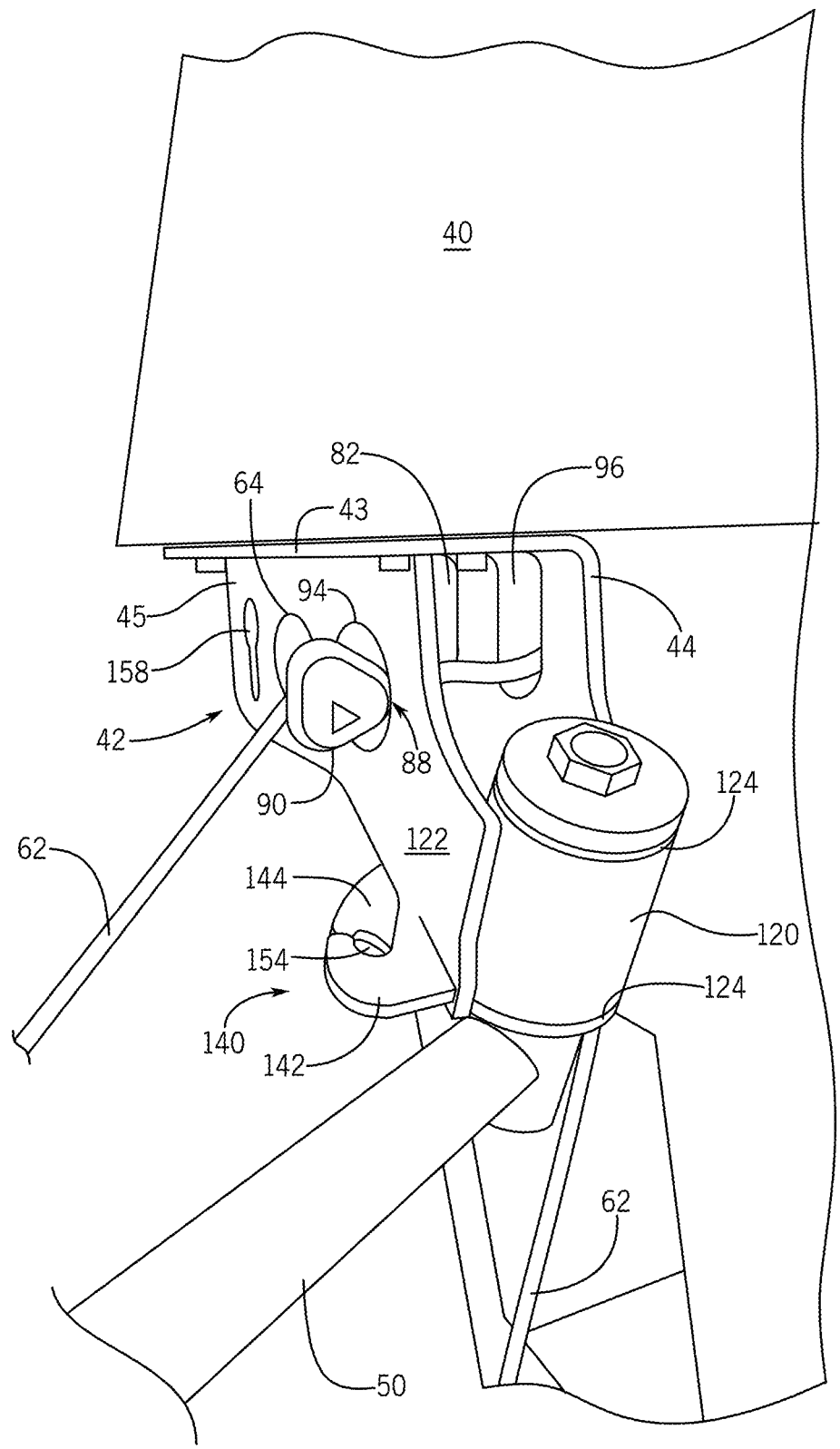
FIG. 19 is a perspective view of a retraction cord adjustment feature in accordance with the present invention.

As depicted in FIGS. 3 and 19, a second hole 88 in the outer support plate 45 is provided as an optional way to adjust the effective length of the flexible retraction member 62 to accommodate stretching, variable distances to the adjacent milking stall 32, animals of various sizes, and so on. To adjust the effective length of the flexible retraction member 62, in this case a cord, the operator wraps the cord 62 around a wedge 90 and joins the wedge 90 and the cord 62 into the second hole 88 thereby shortening the effective length of the retraction cord 62 to suit the needs at hand. Preferably, the second hole 88 is lined with a grommet 94 that provides a resilient friction fit with the wedge 90 for secure engagement. A second mating hole 96 can be provided in the inner support plate 44 to lead the retraction cord 62 from the cylinder of the milker unit detacher 46 out to the wedge 90 and back again to exit through the first mating hole 82 and the extension point 64.

As seen, for example, in FIGS. 1 through 4, and 7, after extending through the extension point 64, the retraction cord 62 extends parallel to and above the support arm 50, and through a support arm guide 100 that is joined to the end, or near the end, of the support arm 50. The support arm guide 100, best illustrated in FIGS. 9 through 14, includes a plate 102 and a low-friction guide ring 104.

The plate 102 is preferably welded to the support arm 50, but it could be formed in the support arm 50 or joined to the support arm 50 in any suitable manner. The shape, size, and orientation of the plate 102 are selected to provide optimum mechanical advantage when cooperating with the extension point 64 to retract the retraction cord 62 and the milker unit 52 with a smooth movement The guide ring 104 is similar to the guide ring 72 described above by having a tapered exterior 106, a retaining portion 108, and a fastener 110 such as the c-shaped clip illustrated in FIGS. 9 to 14. Other guide ring 104 shapes and constructions are possible, including hooks, grooves, slots, and so on.

The distal end of the retraction cord 62 is connected to the milker unit 52 either directly or using a suitable milker unit connector, such as the spring-loaded clip 114, illustrated in FIG. 7, for example. The retraction cord 62 can be joined to the milker unit 52 in any other suitable manner. It is preferred to have the quick-release connector 114 such as the illustrated clip, but other quick-release connectors 114 enable quick and easy maintenance when necessary.

The support arm 50 can be any desired shape and length to match the particular dairy in which it is installed. The support arm 50 is illustrated in FIGS. 1 to 8 as being straight, or it can be curved, as illustrated in FIGS. 9 to 18. Other curves, bends, shapes, and structures can be used for the support arm 50.

The support arm 50 is joined to the support arm frame 42 using a pivot 120 to enable the support arm 50 to move between the milking position (FIGS. 1 through 4, and 8) and the parked position (FIGS. 5 through 7). The pivot 120 is joined to the support arm frame 42 in any suitable manner, but the preferred embodiment of being welded to extensions 122 of the inner support plate 44 and the outer support plate 45 provides a robust support that minimizes wear and vibration. The pivot 120 preferably includes seals 124 to prevent or at least reduce seepage of fluids into the pivot 120. The support arm 50 can be oriented to swing left-to-right or right-to-left or in both directions, if desired, to reach whichever side of the cabinet 40 that the stall 32 is on.

Also, in accordance with the present invention, the pivot 120 is mounted at an angle to pivot along an axis 128 relative to a vertical axis 130, so that the support arm 50 can move from the parked position to the milking position more readily than if the pivot 120 were mounted to pivot about the vertical axis 130. Indeed, it is preferred that the angled pivot axis 128 be angled enough to allow the pivot arm 50 to move from the parked position to the milking position solely from the force of gravity acting on the support arm 50 and any other equipment hanging on the support arm 50. The angle of pivot angle axis 128 to accomplish this natural movement to the milking position will vary depending upon the length, shape, and weight of the support arm 50, as well as the weight of the equipment hanging on the support arm 50 and where that equipment is positioned. In the illustrated embodiment, the angled pivot axis 128 is approximately 25°, but other angles from 15° to 35°, and particularly 20° to 30°, will work as well.

The use of the angled pivot axis 128 also obviates the need for a spring or other mechanism that would force or bias the support arm 50 toward the milking position although such a device could also be used. Further, to return the support arm 50 toward the parked position, the milker unit detacher 46 or an operator merely needs to apply enough force to overcome gravity and not the force of an additional biasing device such as a spring. Omitting another mechanism also reduces cost, maintenance, and replacement parts if an animal damages the support arm 50. Should it become necessary to lock the support arm 50 in the parked position, a pin or other simple device can be used to hold the support arm 50 in place, as explained in more detail below.

Figure 14:
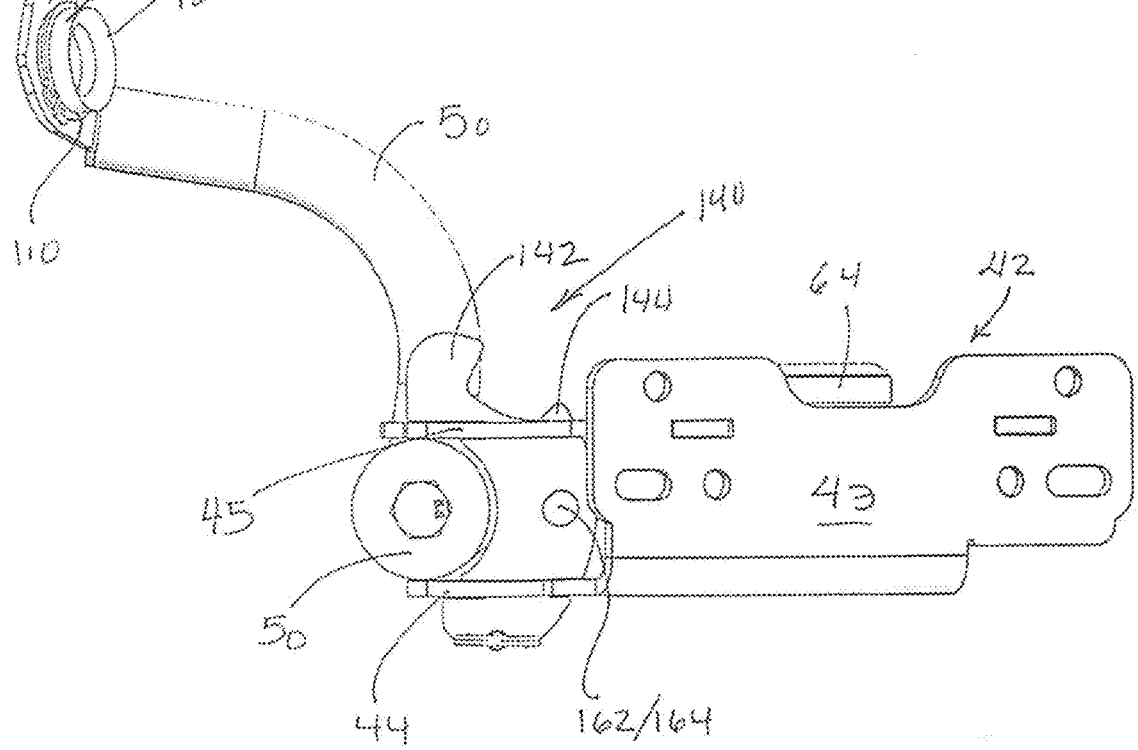
FIG. 14 is a top perspective view of the support arm assembly in the milking position of FIG. 8.
Figure 13:
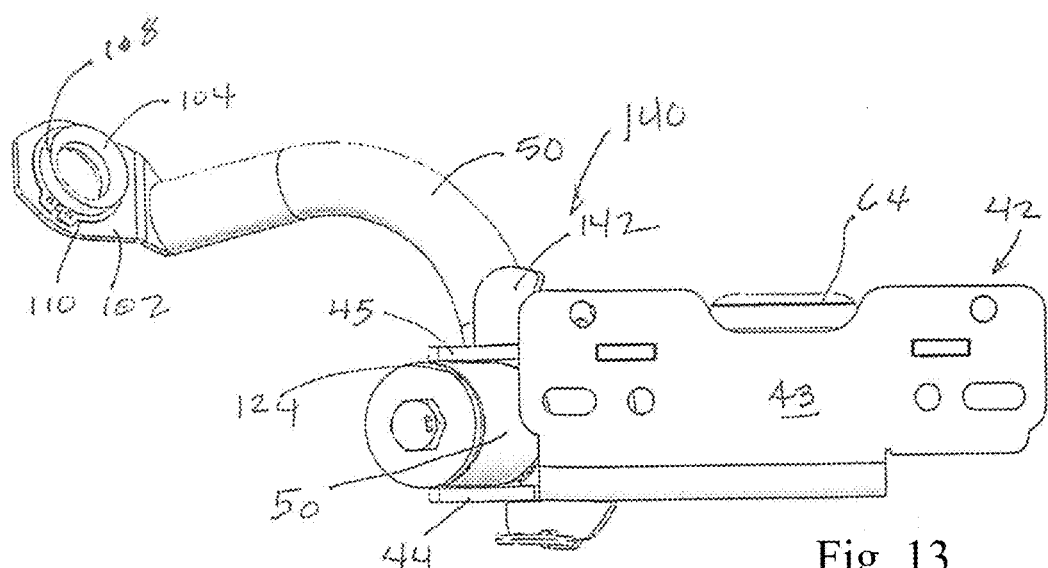
FIG. 13 is a plan view of the support arm assembly in the milking position of FIG. 7.
Figure 16:
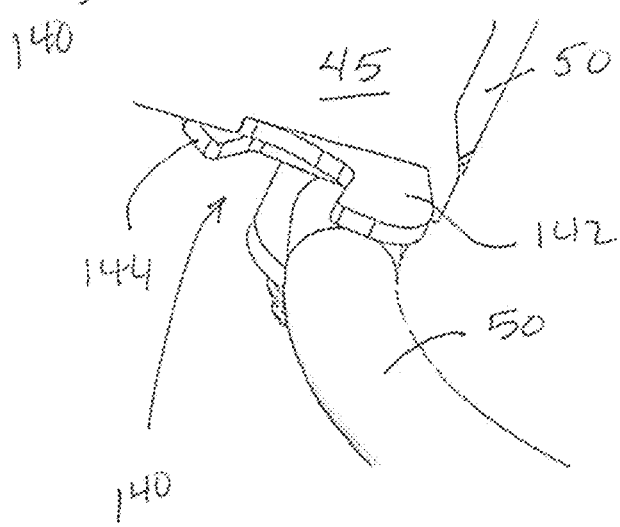
FIG. 16 is a partial perspective view of an adjustable milker unit hose support in a parked position in accordance with the present invention.

An adjustable hose support apparatus 140 in accordance with the present invention can be incorporated into the pivoting support arm 50 and the support arm frame 42 by including a stationary jaw 142 fixed the stationary support arm frame 42 and a moving jaw 144 fixed to the pivoting support arm 50. In FIGS. 14 and 16, the moving jaw 144 is spaced apart from the stationary jaw 142 in the parked position, but in FIGS. 11, 15, 17, and 18 the moving jaw 144 is moved toward the stationary jaw 142 in the milking position. The stationary jaw 142 is the primary hose support element with the moving jaw 144 being useful, but possibly unnecessary if another type of hose support is provided to releasably engage the hose support member 60.

The hose support member 60 can be inserted between the stationary jaw 142 and the moving jaw 144 as the support arm 50 is pivoted toward the milking position. The hose support member 60 is positioned between the stationary jaw 142 and the moving jaw 144 at any desired position along the length of the hose support member 60 to adjust the effective length of the hose support member 60. In practice, an operator holds the hose support member 60 in between the stationary jaw 142 and the moving jaw 144 as the operator is pivoting the support arm 50 toward the milking position to provide a slot 154 in which the hose support member 60 is disposed. The slot 154 can be any suitable size and it is preferred to be slightly wider than the hose support member 60, so that the hose support member 60 can be inserted into the slot 154 from the side even in the milking position. The slot 154 can also be dimensioned to clamp down on the hose support member 60, if desired. The hose support member 60 can include markings or other indicators to aid the operator in selecting a moving location that correspond to cows of various udder sizes, for example. Further, it is preferred that the hose support member 60 be flexible to enable ease of movement, and convenient adjustments and use.

In a preferred embodiment, the hose support member 60 is a ball chain having narrow portions 150 and ball portions 152 (FIGS. 17 and 18, for example) that resist being pulled through the slot 154 between the stationary jaw 142 and the moving jaw 144 when the jaws 142 and 144 are in the closed or milking position. When such a ball chain is used, it is preferred that the moving jaw 144 not close down entirely on the stationary jaw 142, and instead form the slot 154 that is slightly larger than the diameter of the narrow portions 150 of the ball chain. With such an arrangement, the ball portion 152 immediately above the jaws 142, 144 prevents the hose support member 60 from pulling downward through the slot 154, while still permitting the hose support member 60 to be inserted from the side. The stationary jaw 142 and the moving jaw 144 are preferably fixed to their respective mounting locations with a weld, but other connections or extensions of the plates forming the support arm frame 42 can be used. Indeed, it is possible to form the jaws 142 and 144 in other elements of the support frame 42 and the support arm 50, respectively.

Figures 17, 18:
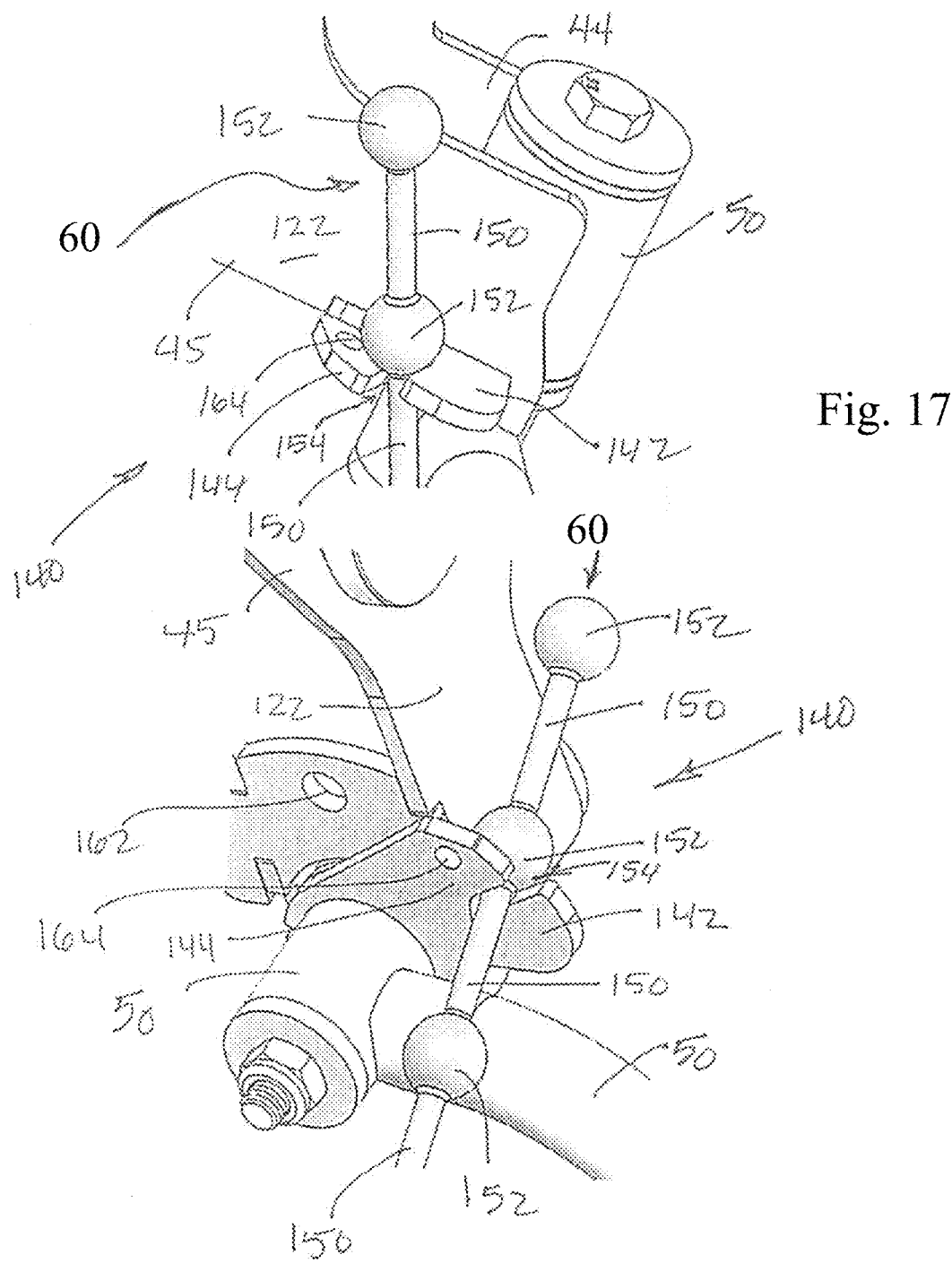
FIG. 17 is a partial front view of a fixed hose support in accordance with the present invention.
FIG. 18 is a top partial perspective view of the adjustable milker unit hose support of FIG. 11 engaging a flexible hose support member.

Also preferably, the hose support member 60 is made of a flexible and resilient material such as rubber, silicone, plastic, rope, cord or other material (FIGS. 17 and 18). Other hose support elements other than a stationary jaw 142 for releasably engaging the hose support member 60 are possible, including using hooks, plate slots, cradles, and other elements that support the hose support member 60 in the milking position.

The hose support member 60 is connected to the hoses 56 using any suitable hose connector 160. A spring-loaded clamp, as illustrated in FIGS. 1 to 8, is preferred.

When milking is completed and the milker unit detacher 46 activates to retract the milker unit 52 from the milking position under an animal toward a parked position toward the support arm frame 42, the retraction cord 62 draws the milker unit 52 toward the support arm guide 100. At this point, the milker unit 52 engages the support arm guide 100 and the force exerted by the retraction cord 62 causes the support arm 50 to pivot about the pivot axis 128. In so doing, the moving jaw 144 moves away from the stationary jaw 142 thereby creating an opening that allows the hose support member 60 to drop out by force of gravity (passively), so it does not interfere with the detaching process and is available to be readjusted in the next milking operation.

Should only an adjustable hose support mechanism 140 having a single stationary jaw 142 (or other single-sided element) or should the hose support member 60 otherwise hang up on the stationary jaw 142 and remain in position, movement of the support arm 50 toward the parked position will actively engage the hose support member 60 and dislodge it from the stationary jaw 142, so it will not interfere with the detaching operation and be available for adjustment in the next milking operation.

Figure 2:
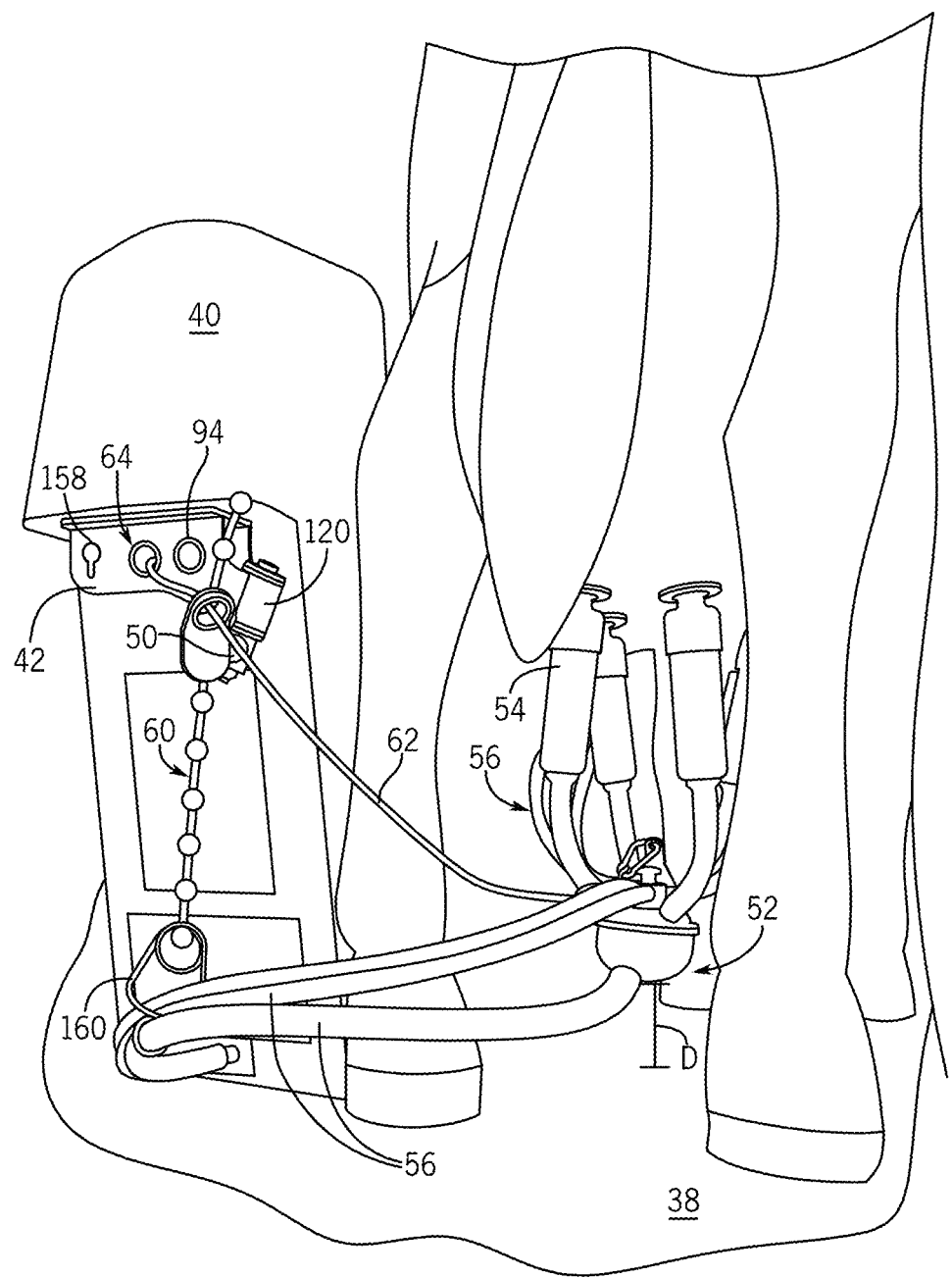
FIG. 2 is a perspective view of the support cabinet, arm, and adjustable hose support of FIG. 1.
Figure 9:
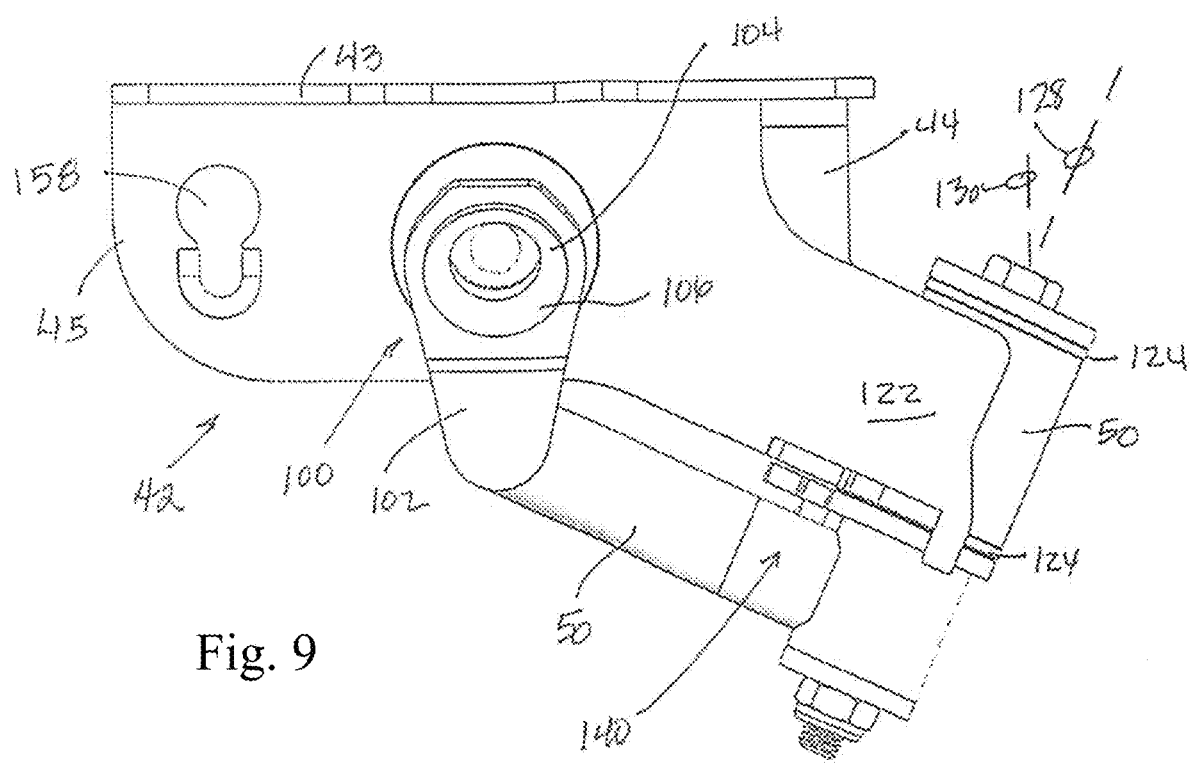
FIG. 9 is a front view of a support arm assembly in a parked position in accordance with the present invention.
Figure 10:
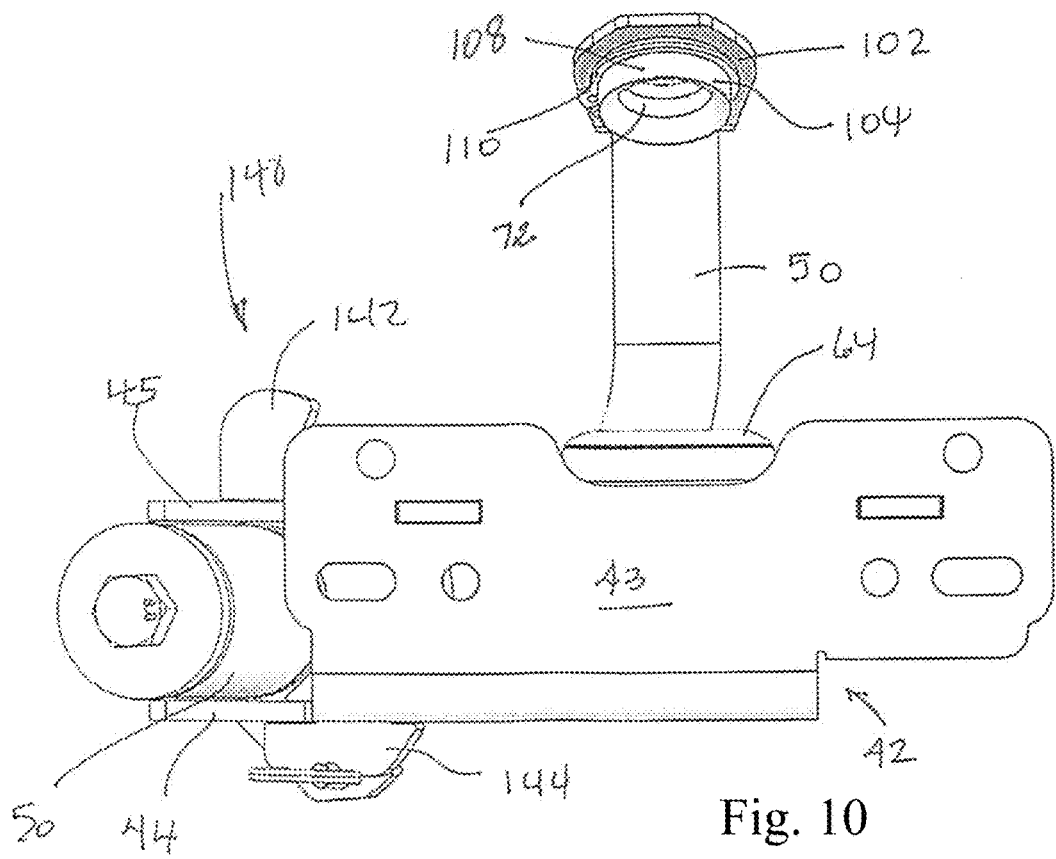
FIG. 10 is a plan view of the support arm assembly of FIG. 5 in the parked position.
Figure 11:
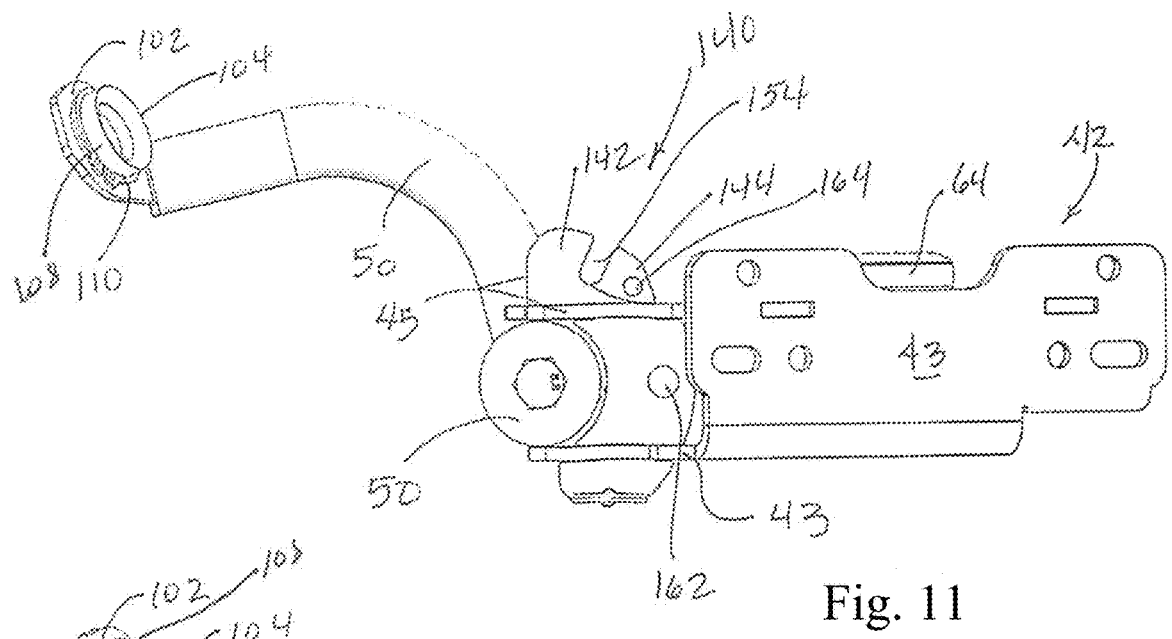
FIG. 11 is a top perspective view of the support arm assembly of FIG. 5.
Figure 12:
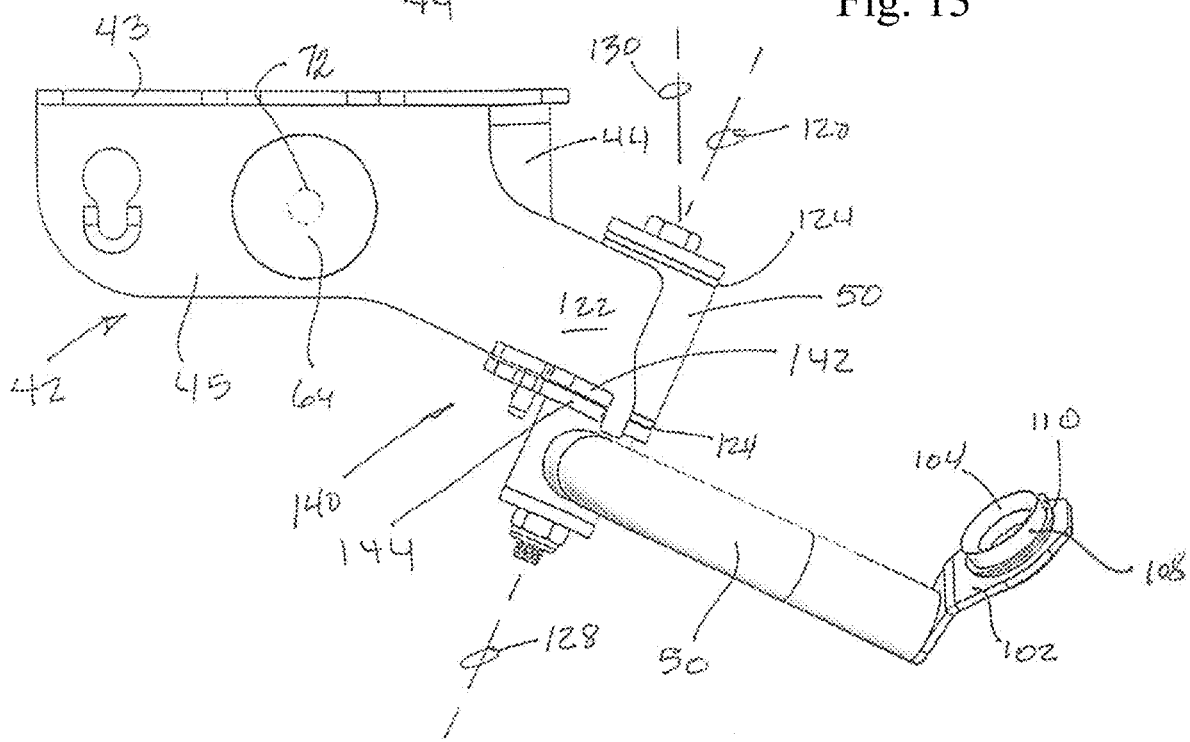
FIG. 12 is a front view of the support arm assembly of FIG. 5 is a milking position.
Figure 15:
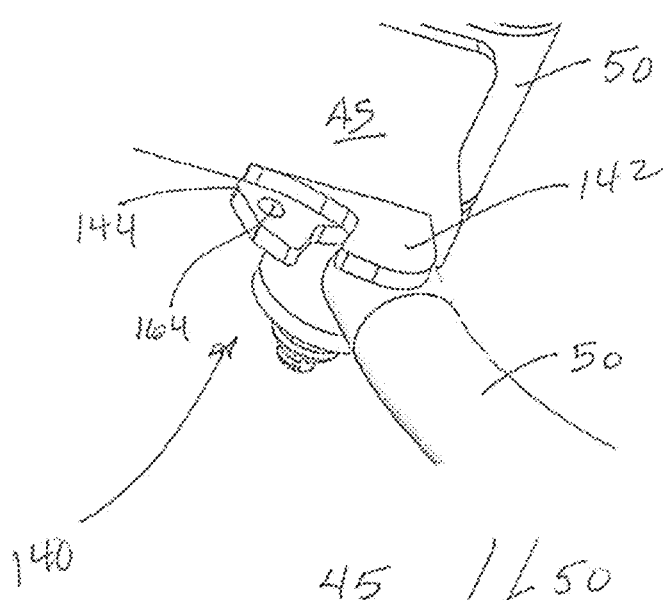
FIG. 15 is a partial perspective view of an adjustable milker unit hose support in a milking position in accordance with the present invention.

In some circumstances, particularly those where a dairy herd has relatively consistently sized udders, it may be desirable to forego the adjustment of the hose support member 60 and simply join it to the support arm frame 42. FIGS. 2, 9, and 12 illustrate a keyhole-shaped hole 158 in the outer support plate 45, and through which the hose support ball chain can be inserted at a desired length and left alone. In this position, the hose support member 60 is not going to interfere with movement of the other components. Once the milker unit 52 is fully in the parked position, the milker unit detacher 46 holds the retraction cord 62 taught so that the support arm 50 cannot move toward the milking position until an operator releases the milker unit detacher 46, typically by activating a release button (not illustrated) on the front of the cabinet 40.

As described above, it may be desirable during maintenance for example, to hold the support arm 50 in a parked position and not let gravity move it toward the milking position when the milker unit detacher 46 is released. In a such case, a fixed pin hole in the stationary jaw 142 aligns with a mating hole 164 in the moving jaw 144 when they are in the parked position so that a pin or other device can be inserted through both holes 162 and 164 to retain the support arm 50 in place. (See FIGS. 11, 15, 17, and 18, for example.)

The present invention can be made of any suitable materials able to withstand a harsh dairy environment. For example, the metal portions are preferably made of stainless steel.

The foregoing detailed description of the drawings is for clearness of understanding only and no unnecessary limitations therefrom should be read into the following claims.

The invention claimed is:

1. An adjustable milker unit hose support for a milker unit hose, the adjustable hose support comprising: a frame; a support arm is pivotably joined to the frame for movement between a milking position and a parked position; a stationary jaw joined to the frame; a moving jaw fixed to the support arm for movement therewith, and disposed to oppose the stationary jaw; and a flexible hose support member having a plurality of releasably engageable positions, wherein the flexible hose support member is entrapped between the stationary jaw and the moving jaw when the support arm is in the milking position to support the milker unit hose above a floor and passively released from the stationary jaw and the moving jaw as the support arm moves to the parked position.

2. The adjustable hose support for a milker unit hose of claim 1, wherein the support arm is moveable from the parked position to the milking position at least partially by force of gravity.

3. The adjustable hose support for a milker unit hose of claim 1, and further comprising:
a pivot joined to the frame and to the support arm, and defining an axis of rotation that is offset from vertical.

4. The adjustable hose support for a milker unit hose of claim 1, and further comprising:
a pivot joined to the frame and to the support arm, and defining an axis of rotation that is offset from vertical at an angle of between about 15° and about 35°.

5. The adjustable hose support for a milker unit hose of claim 1, and further comprising:
   a pivot joined to the frame and to the support arm, and defining an axis of rotation that is offset from vertical at an angle of between about 20° and about 30°.

6. The adjustable hose support for a milker unit hose of claim 1, wherein:
   the stationary jaw and the moving jaw passively release the flexible hose support member before the support arm reaches the parked position.

7. The adjustable hose support for a milker unit hose of claim 1, wherein the support arm engages the flexible hose support member to permit the flexible hose support member to be passively released from the stationary jaw and the moveable jaw as the support arm moves toward the parked position.

8. The adjustable hose support for a milker unit hose of claim 1, and wherein the frame defines a fixed flexible hose support member holder to releasably engage the flexible hose support member.

9. The adjustable hose support for a milker unit hose of claim 1, wherein support arm moves about an axis that is at an angle relative to vertical so that the support arm pivots toward the milking position at least partially from the force of gravity.

* * * * *